United States Patent

Sehrawat et al.

(10) Patent No.: US 11,405,220 B2
(45) Date of Patent: Aug. 2, 2022

(54) MOVING TARGET AUTHENTICATION PROTOCOLS

(71) Applicant: Seagate Technology LLC, Fremont, CA (US)

(72) Inventors: Vipin Singh Sehrawat, Shugart (SG); Dmitriy Vassilyev, Shugart (SG)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 35 days.

(21) Appl. No.: 16/912,482

(22) Filed: Jun. 25, 2020

(65) Prior Publication Data

US 2022/0014386 A1    Jan. 13, 2022

(51) Int. Cl.
*H04L 9/32*     (2006.01)
*H04L 9/00*     (2022.01)
*H04L 9/40*     (2022.01)

(52) U.S. Cl.
CPC ............ *H04L 9/3255* (2013.01); *H04L 9/008* (2013.01); *H04L 9/3228* (2013.01); *H04L 9/3297* (2013.01); *H04L 63/0876* (2013.01)

(58) Field of Classification Search
CPC ..... H04L 9/3255; H04L 9/008; H04L 9/3228; H04L 9/3297; H04L 63/0876
See application file for complete search history.

(56) References Cited

U.S. PATENT DOCUMENTS

| 9,692,757 | B1* | 6/2017 | Mikulski | H04L 9/3242 |
| 10,554,405 | B1* | 2/2020 | Endress | H04L 9/3247 |
| 2016/0029213 | A1* | 1/2016 | Rajadurai | H04L 63/062 |
| | | | | 380/283 |
| 2016/0105402 | A1* | 4/2016 | Soon-Shiong | H04L 63/0428 |
| | | | | 713/164 |
| 2019/0013950 | A1* | 1/2019 | Becker | H04L 9/3093 |
| 2019/0104121 | A1* | 4/2019 | Khandani | H04L 9/0858 |
| 2019/0318103 | A1* | 10/2019 | Anton | H04L 9/3239 |
| 2020/0320340 | A1* | 10/2020 | Wentz | G06K 9/6215 |

OTHER PUBLICATIONS

D. Boneh et al., "Key Homomorphic PRFs and Their Applications," CRYPTO 2013, pp. 410-428.
V. Sehrawat et al., "Bi-homomorphic Lattice-Based PRFs and Unidirectional Updatable Encryption," CANS, pp. 3-23.

* cited by examiner

*Primary Examiner* — Matthew Smithers
*Assistant Examiner* — Zoha Piyadehghibi Tafaghodi
(74) *Attorney, Agent, or Firm* — Holzer Patel Drennan

(57) ABSTRACT

In one implementation, the disclosure provides systems and methods for generating a secure signature using a device-specific and group-specific moving target authentication protocol. According to one implementation, generating the secure signature entails determining a state of a first device in association with a select time interval. The state of the first device is defined by one or more time-variable characteristics of the first device. The device computes an output for a signing function that depends upon the determined state of the first device associated with the first time interval.

17 Claims, 4 Drawing Sheets

MOVING TARGET AUTHENTICATION PROTOCOLS

SUMMARY

In one implementation, a system for generating a secure signature uses a device-specific and/or group-specific moving target authentication protocol. Generating the secure signature entails at least determining a time-variable state of a first device in association with a select time interval and computing an output for a signing function that depends upon the determined state of the first device associated with the first time interval.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
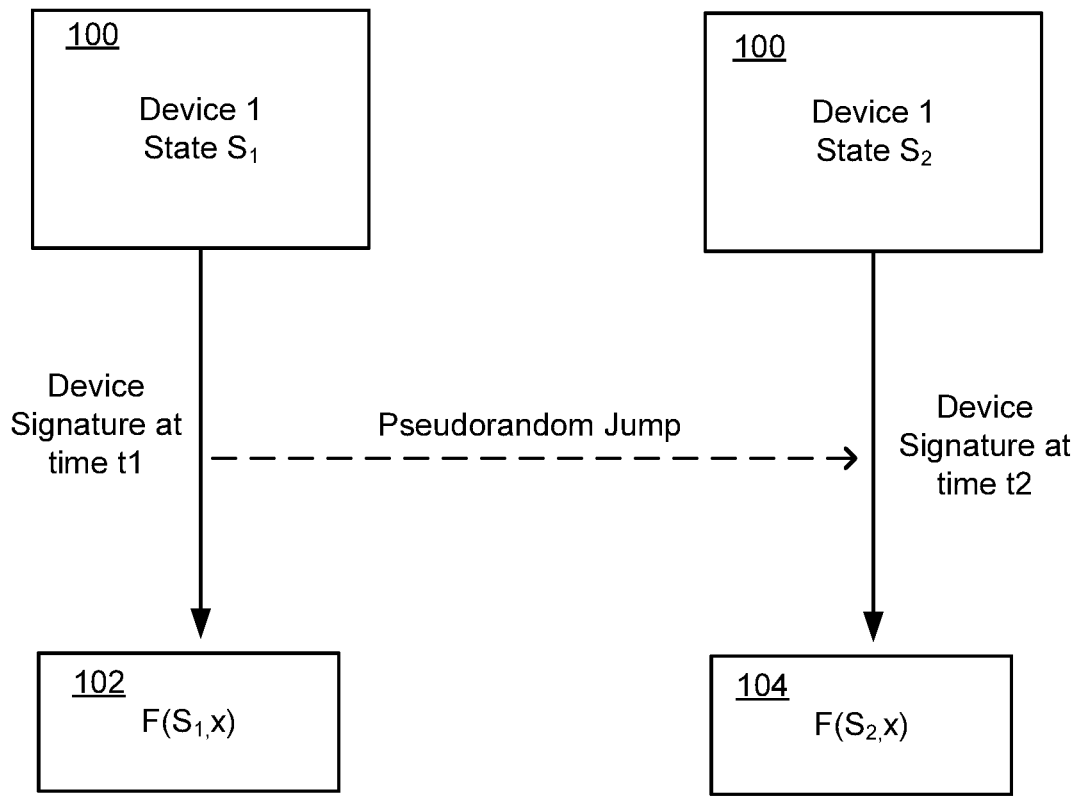
FIG. 1 illustrates an example computing device that implements a device-independent moving target authentication protocol.

In data storage, key rotation refers to the process of periodically exchanging cryptographic key material that is used to protect the data. Key rotation can be useful in various circumstances, such as to revoke old keys that may have been compromised or to enforce data access revocation. Updateable encryption (UE) refers to an encryption method in which the data owner produces an update taken that allows the migration of a ciphertext from an old key to a a new key without exposing the old key to the party performing the encryption. This is advantageous because the host (party performing the encryption) is not offered an advantage in breaking the confidentiality of the protected data. One drawback of UE schemes is that most of these schemes support only bidirectional updates—i.e., the update token used to refresh the ciphertext for the current epoch can also be used to revert back to the previous epoch's ciphertext. Hence, unidirectional updates (e.g., where the update tokens cannot undo the ciphertext updates) is a highly desired feature.

In recent years, a few unidirectional UE schemes have emerged. One promising type of unidirectional UE encryption relies on the use of pseudorandom functions (PRFs) known as key-homomorphic pseudorandom function (KH-PRFs).

In cryptography, a pseudorandom function family (PRF) is a collection of efficiently-computable functions which emulate a random oracle (e.g., a function whose outputs are fixed completely at random). This emulation exists in the sense that no efficient algorithm can distinguish (with significant advantage) between a function chosen randomly from the PRF family and the random oracle. When used in cryptographic applications, a device uses a private key (k) to select the function from the PRF family that is used to encrypt outgoing data. For example, the notation F(k1, x) may be used to denote a member of a PRF family selected based on key k1.

A PRF family F is said to be key-homomorphic (KH-PRF) there exists an efficient algorithm that can, upon receipt of inputs F(k1, x) and F(k2, x), output a group operation performed on the key space (k1, k2) without knowing either of k1 or k2. Stated differently, a pseudorandom function $F: K \times X \rightarrow Y$ is said to be key homomorphic if given F(k1, x) and F(k2, x) there is an efficient algorithm to compute F(k1$\oplus$k2, x), where $\oplus$ denotes a group operation on k1 and k2 such as XOR (an additive cipher). Key homomorphic PRFs are natural objects to study and have a number of interesting applications: they can simplify the process of rotating encryption keys for encrypted data stored in the cloud, they give one round distributed PRFs, and they can be the basis of a symmetric-key proxy re-encryption scheme.

Despite offering the above advantages, all previous KH-PRF based cryptographic schemes remain vulnerable to impersonation attacks once the private key is compromised. This vulnerability originates from the fact that all existing PRF and KH-PRF constructions are device independent (along with all other known encryption schemes). Device independent means that the algorithm acts identically regardless of which device implements the it. For example, if device A and device B both implement a KH-PRF encryption scheme, the particular instance of the algorithm chosen for encryption depends upon the private key, but not on any characteristic that is unique to device A or device B.

The device-independent nature of existing signature algorithms presents a lingering vulnerability in instances of authentication. If a malicious actor wants to forge a signature encrypted by device A, all that is needed is the private key for device A and knowledge of the PRF family that is used by device A (or by a group of computers to which device A belong that jointly implement a same encryption scheme). The malicious actor does not have to know anything specific about device A.

The herein disclosed technology provides for a device-dependent KH-PRF based encryption scheme in which the inherent and unique characteristics of the device performing the calculations govern the behavior of the signature algorithms (e.g., the signature algorithm behaves differently on different devices). Under this scheme, different devices in group implementing a same KH-PRF based encryption scheme may encrypt a same data string differently even given the exact same key due to their own unique and inherent characteristics at a given point in time. As will be described herein, these unique and inherent characteristics (referred to as the "state of the device") self-transform with time. Thus, an individual device may encrypt a same data string differently at two different points in time due to the fact that the device's unique and inherent characteristics evolve in time.

Due to the pseudorandom, self-transformative properties of the herein-disclosed device-specific encryption scheme, the scheme may also be accurately described as a "moving target post-quantum authentication protocol." The term "moving target" refers to a strategy of introducing a dynamic and constantly evolving attack surface across multiple system dimensions so as to increase the uncertainty for bad actor. The disclosed encryption scheme is one that "moves" randomly (due to the evolving state of the individual device) without the need of any dedicated encryption channels or communication rounds. This scheme is also "post-quantum" meaning that the best available mathematical estimates suggest that a quantum computer would be unable to impersonate a device implementing the device-dependent authentication protocol.

FIG. 1 illustrates an example computing device 100 that implements a device-independent moving target authentication protocol. At a first time, t1, the computing device 100 has a state $S_1$. The state may be understood as representing a particular subset of characteristics of the device itself or observed on the device in a given time interval. In the particular implementations disclosed herein, the device state $(S_1)$ is a metric representing communication and/or hardware errors observed on device 1 over a first defined time interval. Notably, the conceptual use of a time-dependent device state as a basis for encryption may extend to other mutable and measurable characteristics of the device in different implementations.

At a time t1 when the computing device 100 has a state $S_1$, the computing device 100 generates a secure signature 102 (also referred to herein as an authentication code) that is to be sent along with encrypted data to a recipient device (not shown) which, in turn, performs actions to verify that the data originated at the computing device 100. The secure signature 102 ($F(S_1,x)$) may be understood as the output of a signature algorithm that selects a signing function that depends on the state of the device at the particular point in time that the signature is generated. Although 'F' may designate any function in various implementations, this function refers to a member of a key-homomorphic pseudorandom family (KH-PRF) that is selected based on the state $S_1$ and also computed based on this state.

At a time t2 when the computing device 100 has a different state $S_2$, the computing device 100 again generates another secure signature 104. The secure signature 104 differs from the secure signature 102 due to the fact that the unique characteristics of the computing device 100 influencing $S_1$ have changed between times t1 and t2. For example, a new subset of communication and/or hardware errors have been observed during a time interval corresponding to t2. The evolution between states $S_1$ and $S_2$ may be understood as a pseudorandom jump that is uniquely tied to observations of the computing device 100. Since the state of the device has changed, the signature algorithm pseudorandomly samples a different function ($F(S_2,x)$) to generate the secure signature 104. In one implementation, $F(S_2,x)$ represents a member of a PRF or KH-PRF family that is selected based on the state $S_2$.

Since the very characteristics of the encrypting device cause the signature algorithm to behave differently at different points in time, there is no need for dedicated rounds or channels to implement unilateral key rotation. Likewise, the secure signatures 102 and 104 are very difficult to forge because they are device-dependent and the malicious (impersonator) must guess not only a private key from a finite number but also a state value tied to a specific point in time for a particular device.

Figure 2:
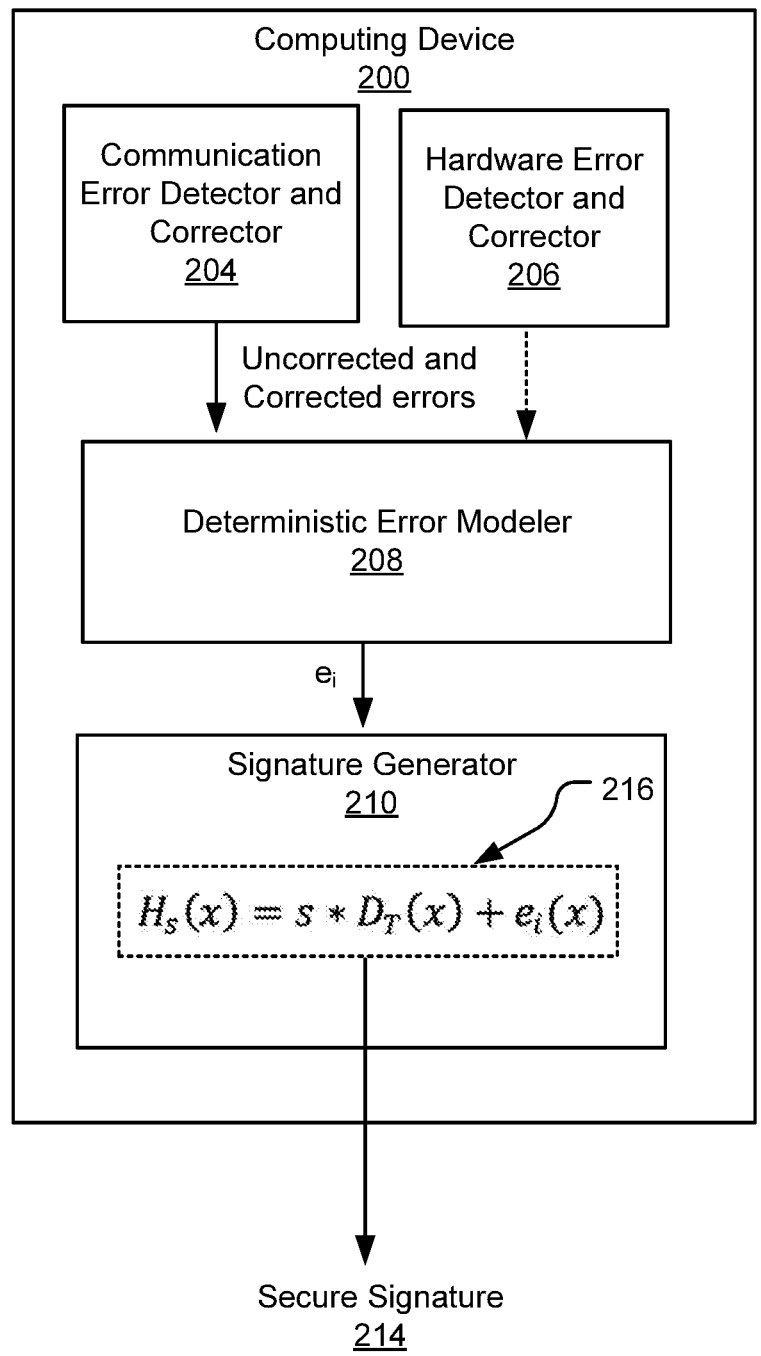
FIG. 2 illustrates another example computing device that implements a device-specific moving target authentication protocol to generate a secure signature.

FIG. 2 illustrates another example computing device 200 that implements a device-specific moving target authentication protocol to generate a secure signature 214. The computing device 200 is shown to include a number of modules which may be understood as including software or a combination of software and hardware including a communication error detector and corrector 204, a hardware error detector and corrector 206, a deterministic error modeler 208, and a signature generator 210.

The communication error detector and corrector 204 detects errors affecting a broadcast communication channel jointly shared by the computing device 200 and other devices in a group jointly implementing a data security scheme. The communication error detector and corrector 204 executes an error correction code (ECC) that uses parity bits encoded within received communication streams to correct transmission errors, and records the corrected versions of the communications.

Although the communication error detector and corrector 204 may implement one or more of a number of suitable different ECCs in different implementations, one particular implementation of the device-specific moving target authentication protocol uses Golay Codes. For each communication observed within a communication channel of the device, the error detector and corrector 204 determines and records an uncorrected communication vector and its corresponding corrected vector. These vectors are provided to a determinist error modeler 208.

Notably, different devices using a same broadcast communication channel may each detect combined errors that have statistically close distributions to the combined errors detected at the other devices sharing the broadcast communication channel. This is key to verification of the secure signature 214, such as per the exemplary process discussed below with respect to FIG. 3.

While the communication error detector and corrector 204 is actively detecting, correcting and recording communication errors, the hardware detector and corrector 206 is similarly detecting and recording hardware errors that occur locally on the computing device 200. Examples of hardware errors include, without limitation, I/O device errors, I/O bus reporting errors, chipset error signals, processor machine check exceptions, etc. The hardware error detector and corrector 206 records two vectors in association with each error—e.g., one representing the recorded hardware event with the error and one corresponding to the event without the error. The distance between the two vectors yields the error vectors which are provided to the deterministic error modeler 208.

Although FIG. 2 illustrates the deterministic error modeler 208 receiving both hardware and communication errors, still other implementations of the device-specific moving target authentication depend upon whether secure signature 214 is (1) a unique individual device signature used for individual device authentication or (2) a group signature used for group authentication. As used herein, the term "group signature" refers to a signature that is usable to identify a particular group of devices as a source of a communication as opposed to a specific individual device. For example, it may be desirable to anonymously send data between devices in a group but still allow group members to be authenticated as being devices that are indeed part of the group.

Communication errors occurring within a network may be jointly accessed and known to other members of a group using the same broadcast channel. For this reason, group signatures generated based on communication errors associated within intra-group communication channels may be verifiable by other members of the group with access to the same communication channels. In contrast to communication errors, hardware errors are specific to an individual device and devices within a same secure network are not privy to the hardware errors of other devices on that network. Thus, hardware errors provide a basis of individuality from which individual device secure signatures may be created.

The communication error detector and corrector 204 and the hardware detector and corrector 206 continuously record errors in association with a rolling time interval, and the deterministic error modeler 208 determines a deterministic error distribution (e.g., a learning with errors (LWE) vector, defined below) in association with each discrete time intervals t1, t2, t3, in the rolling window.

The deterministic error modeler 208 is, in one implementation, a linear regression model that identifies deterministic errors for the device 200 with respect to each predefined time interval in the rolling window. Through an ongoing machine learning training process that evolves while the computing device 200 is actively performing encryption in the field, the deterministic error modeler 208 is provided with the aforementioned subsets of uncorrected and corrected error vectors, and based on such vectors, determines a model that outputs a subset of the detected errors that can be classified as deterministic (e.g., fully determined by the initial conditions and parameter of the model), thereby eliminating the detected stochastic errors (inherent randomness) that cannot be explained by a model.

In one implementation, the deterministic error modeler 208 outputs the deterministic errors in the form of a vector e that has a uniform vector, i.e., E, and that has reducible errors that are uniform and normally distributed, as generally set forth in the theorem set out in Table 1.0 below. The output error is in the form of a vector also referred to herein as a Learning with Linear Regression (LWLR) vector. As used herein, an LWLR vector refers to an error vector that is generated by the deterministic error modeler 208; this error vector belongs to a discrete Gaussian distribution $X^m$ that is the target distribution for sampling LWE errors from.

Essentially, the deterministic error modeler 208 is generated by a linear regression model that uses the time-varying channel impose response (CIR) of the communication channels as source of communication errors, which are used to form its training data. According to one example implementation, the procedure for generating the deterministic modeler 208 is as follows:

Each training data entry $(z_i, t_i)$ contains inputs of the form $z_i=f(x_i)$, for a linear function f, with $t_i=z_i+e_{i-1}$ as the output. Here, $e_{i-1}$ denotes the error vector for iteration/time-interval i−1, which is generated by communication and/or hardware errors. A linear regression model is trained with this data. The model generated by this procedure is referred to herein as a deterministic error modeler 208.

Generating Deterministic Errors (Deterministic Error Modeler)

Due to the nature of the training data, the deterministic error modeler 208 must account for the uniform, errors $e_{i-1}$, which are meant to disturb the linearity of the target function. Let $e_r(x)$ and $e_{ir}(x)$ denote the reducible and irreducible error generated by the deterministic error modeler 208 for input x, respectively. The total prediction error e(x) for input x is then defined as: $e(x)=e_r(x)+e_{ir}(x)$, where the reducible error, $e_r$ ($=e_{i-1}$), is uniform and belongs to a normal/Gaussian distribution. Without the knowledge of the predicted output for an input, reducible error cannot be accurately computed. In other words, errors cannot be predicted accurately even with negligible irreducible error. Therefore, adding uniform, non-negligible irreducible error compounds the uncertainty about the total error. Next, we describe the procedure to employ the generated model in order to compute the deterministic errors from a discrete Gaussian distribution.

For each input $x_\square$, the deterministic error modeler 208 is used to generate a deterministic LWE error vector for the function, $z_\square=f(x)$. Let h(x) be the hypothesis of the deterministic error modeler 208. Hence, the total error for input $x_\square$ is $e_\square=f(x)-h(x) \pmod{q}$. In this manner, we generate input-dependent LWE errors. [(i.e., deterministic error vectors to generate valid LWE instances). We form what we call an LWLR instance by uniformly selecting two vectors, namely, a public matrix $A \in \mathbb{Z}_q^{m \times n}$ and a secret seed vectors $s \in \mathbb{Z}_q^n$. An error vector, $e \in \chi^m$, is generated by the deterministic error modeler 208 for an input vector $x \in \mathbb{Z}_q^n$. The LWLR instance is then given as: $(A, u=\langle A(x),s \rangle +e)$.

TABLE 1.0

Theorem: The total LWLR-error, e,
belongs to a discrete Gaussian distribution.
Proof: Each error matrix e has a uniform vector, i.e., $\epsilon$,
and that the reducible errors are
uniform and normally distributed. Let $E_r$ and $E_{ir}$
denote the random variable for reducible
and irreducible error, respectively.
The reducible error for linear regression has a Gaussian
distribution and the target function is defined as $f: \mathbb{Z}_q^t \to \chi^m$.
Therefore, the hypothesis
h(x) must have integer parameters,
and hence $E_r$ belongs to the discrete Gaussian
distribution $\chi^m$. We also know that $E_{ir} \in \chi^m$.
and that the sum of two normally distributed
random variable is also normally distributed.
Hence, if $E(=E_r + E_{ir})$ is the random variable
for the total prediction error, e, then $E \in \chi^m$.
Theorem: LWLR-errors are independent.
Proof: For any inputs $x_i, x_j$ ($x_i \neq x_j$),
the reducible errors, $e_r(x_i)$ and $e_r(x_j)$ are independent
(otherwise there is room for improvement in the model).
Reducible error for an input x
cannot be predicted without the knowledge of the prediction,
h(x) generated by the model
for the true value y = f(x).
The irreducible errors ($e_{ir}$) are uniformly selected from a discrete
Gaussian distribution and the total error is defined as $e(x) = e_r(x) + e_{ir}(x)$.
Hence, independence of the total error follows from the
independent reducible and independent
irreducible errors.

The above concepts can, in one non-limiting example, be adapted to model deterministic errors in the device-specific scenario of FIG. 2 using a linear regression model as follows:

1. A fixed time duration t is set to partition the timeline into clear intervals.
2. Each device in a secure group records its communications from i−1 to i. The device uses Golay codes to correct the communication errors and computes $y_i=c_i-c'_i$, where $c_i \in \mathbb{Z}^m$ is the uncorrected communication vector and $c'_i \in \mathbb{Z}^m$ is its corrected version. From Table 1.0 above, we know that $y_i$ belongs to the LWE-error distribution.
3. Similarly, each device $d_i$ records its hardware errors $h_i$ for the duration i−1 to i. From table 1.0 above, we know that $h_i$ also belongs to the LWE-error distribution.

Using Deterministic Errors to Generate a Device Dependent KH-PRF

For each time interval i, the deterministic error modeler 208 outputs a deterministic error $e_1$. The signature generator 210 generates a secure signature 214, $H_s(x)$, based on a novel device-dependent KH-PRF 216, $H_s(x)=s*D_T(X) \, e_i(x)$ as shown in FIG. 2. In this expression, s represents a private key of the computing device 200, $D_T$ is an input-dependent randomized LWE-matrix generation function (as given in Table 2.0), and $e_i$ represents the deterministic LWLR error computed for the corresponding interval i. The expression $H_s(x)$ is evaluated over an input 'x' which may be any predetermined input, such as public key known to other devices in the same security group, a timestamp corresponding to the interval i, etc. Due to the inclusion of the deterministic error term, in which the device's hardware errors are also factored in, the secure signature is device-specific.

Figure 3:
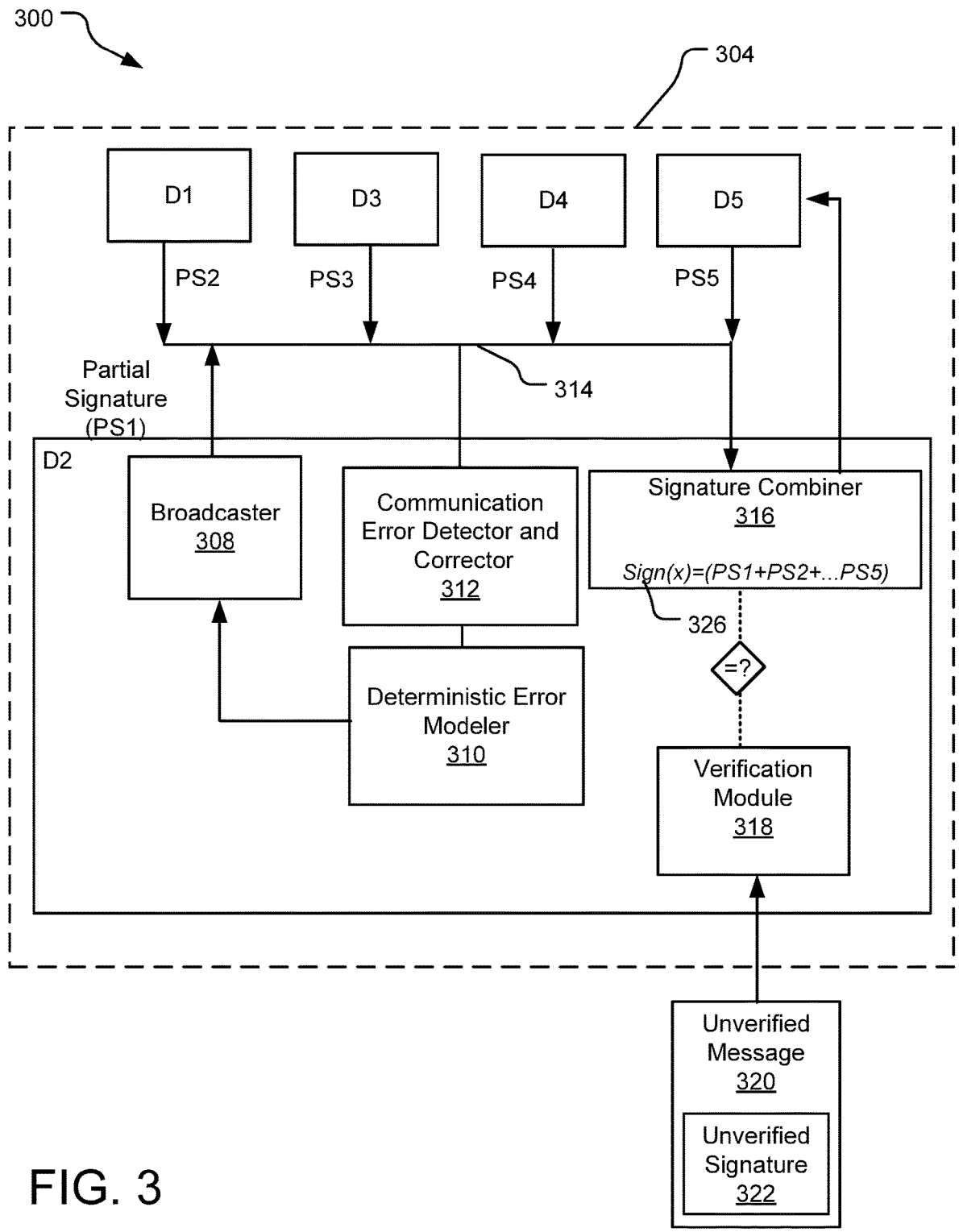
FIG. 3 illustrates an example system that generates a group signature according to a device-specific moving target authentication protocol.

The device-dependent KH-PRF 216 may be derived, in part, using PRF and KH-PRF constructions disclosed in: A. Banerjee, C. Peikert, and A. Rosen, "*Pseudorandom functions and lattices*," EUROCRYPT 2012, pg. 353-370 (hereinafter Banerjee), which is hereby incorporated by reference for all that it discloses or teaches. Banerjee uses a tree-based approach to construct PRF function families and uses errors generated by a rounding function to generate LWE-errors. In one implementation, the device-dependent KH-PRF 216 is derived using a similar tree-based approach but by replacing their central ideal (generating errors via rounding) with an LWLR error generating function. For the sake of completeness, this device-dependent KH-PRF construction is provided below in Table 2.0.

configured for broadcast communications to all other group members and also for independent communications between select members of the group 304 (e.g., D1 may send a message to D2). By example and without limitation, FIG. 3 illustrates an expanded view of device D2, a member of group 304. In one implementation, the specific elements shown and discussed with respect to device D2 are included on (e.g. locally executing on or remotely executing specifically on behalf of) each different device in the group 304. For example, the device D2 and all other devices in the group 304 include communication error detector and corrector 312 and a deterministic error modeler 310, both of which may be understood as having the same or similar characteristics to like-named components described above with respect to FIG. 2.

The communication error detector and corrector 312 detects errors in a communication channel 314 shared by all devices in the group 304 and executes an error correction code to correct the detected communication errors. For example, the communication error detector and corrector 312 may run Golay codes to correct errors in the broadcast group communications that are jointly detectable by all

TABLE 2.0

Device-Dependent KH-PRF Construction:

Let d = [log q]. Define a gadget vector as:
$\quad g = (1, 2, 4, \ldots 2^{d-1}) \in \mathbb{Z}_q^d$
Define a deterministic decomposition function $g^{-1}: \mathbb{Z}_q \to \{0,1\}^d$, such that $g^{-1}(a)$ is a "short" vector and $\forall a \in \mathbb{Z}_q$, it holds that $\langle g, g^{-1}(a)\rangle = a$, where $\langle . \rangle$ denotes the inner product. The function $g^{-1}$ is defined as:
$\quad g^{-1}(a) = (x_0, x_1, \ldots x_{d-1})) \in \{0,1\}^d$,
where $a = \Sigma_{i=0}^{d-1} x_i 2^i$ is the binary representation of a. The gadget vector is used to define the gadget matrix G as:
$\quad G = I_n \otimes g = \text{diag}(g, \ldots, g) \in \mathbb{Z}_q^{n*nd}$,
where $I_n$ is the nxn identity matrix and $\otimes$ denotes the Kronecker product. The binary decomposition function, $g^{-1}$, is applied entry-wise to vectors and matrices over $\mathbb{Z}_q$. Thus, $g^{-1}$, is extended to get another deterministic decomposition function $G^{-1}: \mathbb{Z}_q^{nxm} \to \{0,1\}^{ndxm}$, such that $G \cdot G^{-1}(A) = A$.
Given a full binary tree $\mathcal{T}$, two uniformly selected matrices and $D_0, D_1 \in \mathbb{Z}_q^{nxnd}$, define a full function $\mathcal{T}(x):\{0,1\}^{|\mathcal{T}|} \to \mathbb{Z}_q^{nxnd}$ as:

$$D_\mathcal{T}(x) = \begin{cases} D_x & \text{If } |\mathcal{T}| = 1 \\ D_{\mathcal{T}\cdot l}(x_l) \cdot G^{-1}(D_{\mathcal{T}\cdot r}(x_r)) & \text{otherwise} \end{cases}$$

wherein $x = x_l \| x_t$, for $x_t \in \{0,1\}^{|\mathcal{T}\cdot l|}$ with $\mathcal{T} \cdot l$ and $\mathcal{T} \cdot r$ denoting the left and right halves of $\mathcal{T}$, respectively. The PRF function family is defined as:
$\quad \mathcal{H}_{D_0, D_1, \mathcal{T}, p} = \{H_s: \{0,1\}^{|\mathcal{T}|} \to \mathbb{Z}_p^{nd}\}$,
Where $p \leq q$ is the modulus. A member of the function family $\mathcal{H}$ is indexed by the seed $s \in \mathbb{Z}_q^n$ as:
$\quad H_s(x) = s \cdot D_\mathcal{T}(x) + e_i(x)$
where $e_i(x)$ is our LWE-error, generated via our LWLR-based error generation mechanism on input x and during interval i.

In different implementations, the $e_i$ in equation (1), below quantify different types of error.

$$H_s(x) = s \cdot D_\mathcal{T}(x) + e_i(x) \quad (1)$$

Figure 4:
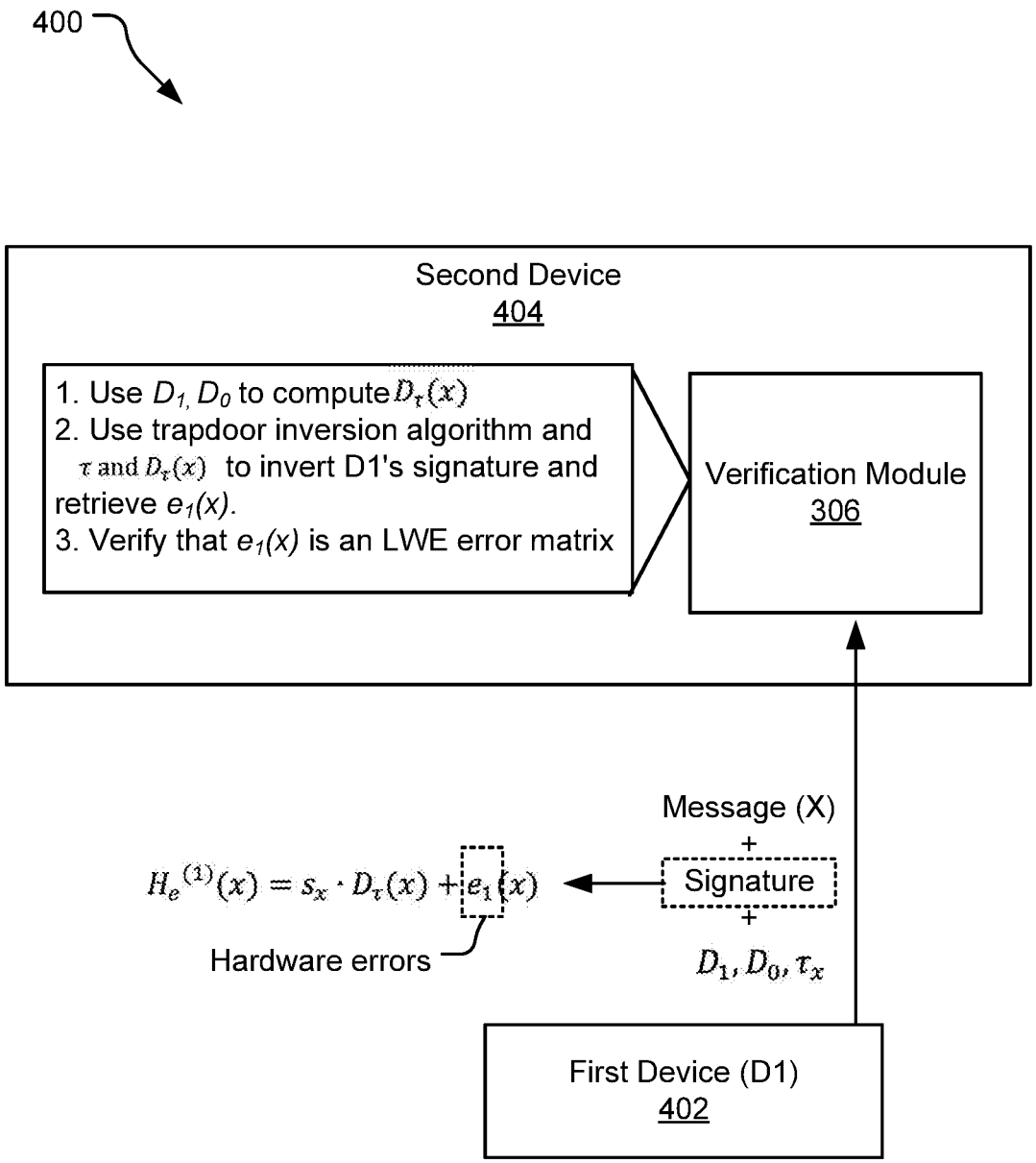
FIG. 4 illustrates an system for generating and verifying an individual device signature according to a device-specific moving target authentication protocol.

When $H_s(x)$ is an individual device signature used for individual device authentication, $e_i$ may represent hardware errors of the computing device 200. In contrast, when $H_s(x)$ is a group signature, $e_i$ may represent communication errors that occur within the same broadcast channel shared by a number of different devices. FIG. 3 and FIG. 4 illustrates exemplary verification sequences for each of these scenarios.

FIG. 3 illustrates an example system 300 that generates a group signature according to a device-specific moving target authentication protocol. The system 300 includes a group 304 of devices (e.g., D1, D2, D3, D4, and D5) that are each devices in the group 304. The corrected errors computed on each device $d_i$ represent combined communication errors for the entire group 304. Since the devices are using the same broadcast channel 314, it can be assumed that the combined errors received at each device must belong to statistically close distributions. The communication error detector and corrector 312 provides uncorrected and corrected communication errors to the deterministic error modeler 310, which in turn uses these errors to refresh its training data and evolve into the next iteration in order to generate new deterministic LWE errors and form new LWLR instances.

In one implementation, all device in the group 304 are provisioned with a same matrix pair $D_0, D_1$. Each device $d_i$ either generates or is provisioned with a private seed/key $s_i$. At each time interval "t", each device in the group 304 computes and broadcasts a partial signature (PS) for the time interval that is based on the device's individual private key $s_i$ and the cumulative group error $e_i$ that is computed on each individual device (e.g., cumulative error for the group 304 computed on device $d_1$). These outgoing partial signatures are combinable to create a group signature 326 that is time-variable (e.g., different in value at time t1, t2, t3, etc.) and also based on collective communication errors observed by all devices in the group 304. In one implementation, the partial signature (PS) generated by each device in the group 304 has the form:

$$H_s^{(t)}(x) = s_i \cdot D_T(t \oplus x) + e_i$$

where $D_T$ is a function based on the two uniformly selected matrices, $D_0$, $D_1$ that are provisioned to each device and in accord with the definitions supplied in Table 2.0 above. Each device in the group includes a signature combiner 316 that combines all the partial signatures generated for the time interval by each respective device (e.g., PS1, PS2, PS3, PS4, PS5). The result of this combination is represented as $\Sigma_{i \in G} H_s^{(t)}(x)$ in equation 3 below, which is also referred to herein as the group signature 326:

$$\text{Sign}(x) = \sum_{i \in G} H_s^{(t)}(x) = \left( \sum_{i \in G} s_i \right) \cdot D_T(t \oplus x) + \sum_{i \in G} e_i \quad (3)$$

The group signature 326 and message pair (Sign(x), x) is published with a trapdoor $\tau_t$ for $D_T(t \oplus x)$ and time-interval/iteration-ID t. In the above, x is a value known to all devices.

The group signature, Sign(X) as in Equation (3) above, is usable to verify whether or not a received transmission originated at one of the devices in the group 304. For example, each outgoing communication sent by a device without the group 304 may be stamped with the group signature Sign(x) that is computed based on the deterministic errors for the group 304 computed at all devices in the group 304 for the time interval in which the outgoing message is transmitted.

By example and without limitation, device D2 is shown receiving an unverified message 320 that includes an unverified signature 322. If the unverified signature 322 is indeed a valid group signature of the form Sign(x) as given by equation (3) above, this signature can be verified by a verification module 318. Specifically, the verification module 318 can perform the following actions to verify the signature.
1. Use the public matrices $D_0$, $D_1$, t, and x to compute $D_T(t \oplus x)$;
2. Use a lattice trapdoor inversion algorithm with $\tau_t$ and $D_T(t \oplus x)$ to invert Sign(x) (eq. 3 above) and to thereby retrieve the error term $e = \Sigma_{i \in G} e_i$ (e.g., right-most term in equation 3, above)
3. Verify that e is an LWE error matrix.

Regarding (2) above, an exemplary lattice trapdoor inversion algorithm can be found in "D. Micciancio and C. Peikert. "Trapdoors for lattices: Simpler, tighter, faster, smaller," *EUROCRYPT* (2012), pp. 700-718, which is hereby incorporated by reference for all that it discloses and teaches).

Extracting the error term $\Sigma_{i \in G} e_i$ and verifying this to be an LWE vector confirms that the unverified signature 322 is indeed a valid LWLR instance that was generated by a device with (1) access to the public matrices $D_0$, $D_1$; and that (2) computed an LWE error. Moreover, since the device D2 receiving the unverified message 320 also independently self-computed the cumulative group errors for time t, the error term extracted from the unverified signature 322 ($\Sigma_{i \in G} e_i$) may be expected to satisfy a predefined correlative relationship to the cumulative group error computed by the deterministic error modeler 310 on the device D2 for the same time period.

Use of the above-described device-dependent signature methodology makes it exceptionally difficult to impersonate a device in the group 304 because impersonation would require a non-group device would need to generate a valid LWLR instance for group 304. In order to achieve that, the non-group device would be required to (1) have access to the public matrices $D_0$, $D_1$; (2) have access to the private keys $s_i$ for each device in the group 304; and (3) generate an LWE error matrix that belongs to a discrete Gaussian distribution that is statistically close to distribution generated by the cumulative communication errors for the devices in group 304.

FIG. 4 illustrates an system 400 for generating and verifying an individual device signature according to a device-specific moving target authentication protocol. The system includes a first device 402 and a second device 404 that are assumed to be members of a set of n devices with active communications among them. At the beginning of each new time interval/iteration, the first device 402 collects its hardware and communication errors. These cumulative errors collected by the first device 402, and the first device 402 uses these errors to update its training data for its deterministic error modeler 208. The first device 402 signs an outgoing message X with a signature including an LWLR instance according to equation (4) below:

$$H_e^{(1)}(x) = s_x \cdot D_T(x) + e_1(x) \quad (4)$$

where $e_1(x)$ represents the LWE error generated by the deterministic error modeler 208 of the first device 402 acting on the input string x, and where $s_x$ denotes the seed/key of the first device 402.

The first device 402 sends a message x to the second device 404 that is signed with the device signature, $H_e^{(1)}(x)$, and that further specifies public matrices $D_0$, $D_1$ used to construct $D_T(x)$ (as described in table 2.0 above) and that also specifies a trapdoor for a lattice inversion algorithm, $\tau_x$ for $D_T(x)$. Recall that the errors used to train the linear regression models, and generate fresh deterministic error modeler 208, consist of communication and hardware errors, out of which the communication errors are shared between devices D1 and D2.

Upon receiving the message x, the second device 404 employs a verification module 06 to verify the message originated at the first device 402. According to one implementation, this verification entails the following actions:
1. Using $D_0$, $D_1$ to compute $D_T(x)$ as described in Table 2.0 above;
2. Using a lattice trapdoor inversion algorithm with $\tau_x$ and $D_T(X)$ to invert $H_e^{(1)}(x)$ (as given by equation 4, above) to retrieve $e_1(x)$; and
3. Verifying that $e_1(x)$ is an LWE error matrix that is statistically close to the "shared" discrete Gaussian distribution for devices D1 and D2. The shared channel impulse response leads to a statistically close Gaussian distribution, which is perturbed by the hardware errors of D1 and D2. But, since the hardware errors are normally distributed, they also belong to some Gaussian distribution. It is known that the sum of two Gaussians is also a Gaussian. Finally, since it is well-known that eavesdropping the channel impulse response is hard, the uniqueness and privacy of the "shared and perturbed" Gaussian for devices D1 and D2 can be assumed. Hence, the verification procedure authenticates with high confidence, $1-(\frac{1}{2})^q$, where q is the LWE security parameter, that the signature was indeed generated by device D1.

In this way, the use of LWE-type hardware errors detected on the device 402 provide the device with a device-specific signature that evolves in time and based on the state of the device.

In the above examples, the various modules shown and described with respect to the computing devices (e.g., the communication error detector and correct, hardware error detector and corrector, deterministic error modeler, signature generator, verification module, signature combiner, and broadcaster) may be all be understood as include software stored on a tangible-computer readable storage media. As used herein, "tangible computer-readable storage media" is defined to explicitly excluded carrier waves freely propagating in space and to include memory devices including without limitation RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can accessed by mobile device.

The embodiments of the disclosed technology described herein are implemented as logical steps in one or more computer systems. The logical operations of the presently disclosed technology are implemented (1) as a sequence of processor-implemented steps executing in one or more computer systems and (2) as interconnected machine or circuit modules within one or more computer systems. The implementation is a matter of choice, dependent on the performance requirements of the computer system implementing the disclosed technology. Accordingly, the logical operations making up the embodiments of the disclosed technology described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method comprising:
    determining a state of a first device in association with a select time interval, the state of the first device being defined by one or more time-variable characteristics, the one or more time-variable characteristics including deterministic errors observed by the first device over the select time interval;
    selecting a signing function based, at least in part, on the deterministic errors observed on the first device over the select time interval;
    computing, on the first device, an output for the signing function that depends upon the deterministic errors observed by the first device over the select time interval; and
    generating a secure signature using the output of the signing function.

2. The method of claim 1, wherein
    deterministic errors include at least one of communication errors occurring in a communication channel of the device and hardware errors of the device.

3. The method of claim 2, wherein the deterministic errors include hardware errors of the first device and the output of the signing function is the secure signature.

4. The method of claim 3, wherein the secure signature is verifiable to confirm a unique identity of the first device.

5. The method of claim 2, wherein the deterministic errors include communication errors detected in a broadcast channel of the first device.

6. The method of claim 5, wherein the secure signature is a group signature verifiable to confirm that the first device is a member of the group and the method further comprises:
    combining the output of the signing function computed on the first device with a signing function output from each other respective device in the group, the signing function output from each other respective device in the group being based on communication errors observed by the respective device in association with the select time interval.

7. The method of claim 1, wherein the signing function is a member of a key-homomorphic pseudorandom function (KH-PRF) family.

8. The method of claim 1, further comprising:
    receiving, at a second device, a message signed with the secure signature;
    computing, at the second device, an error matrix used to generate the secure signature; and
    verifying the error matrix is a Learning With Errors (LWE) matrix.

9. One or more tangible computer-readable storage media encoding computer-executable instructions for executing a computer process, the computer process comprising:
    determining a state of a first device in association with a select time interval, the state of the first device being defined by one or more time-variable characteristics, the one or more time-variable characteristics including deterministic errors observed by the first device over the select time interval;
    selecting a signing function based, at least in part, on the deterministic errors observed on the first device over the select time interval;
    computing, on the first device, an output for the signing function that depends upon the deterministic errors observed by the first device over the select time interval; and
    generating a secure signature using the output of the signing function.

10. The one or more tangible computer-readable storage media of claim 9, wherein
    the deterministic errors include at least one of communication errors occurring in a communication channel of the device and hardware errors of the device.

11. The one or more tangible computer-readable storage media of claim 9, wherein determining the state of the first device further comprises:
    using a trained linear regression model to compute deterministic errors observed by the first device in association with the select time interval.

12. The one or more tangible computer-readable storage media of claim 10, wherein the deterministic errors include hardware errors of the first device and the output of the signing function is the secure signature.

13. The one or more tangible computer-readable storage media of claim 10, wherein the secure signature is verifiable to confirm a unique identity of the first device.

14. The one or more tangible computer-readable storage media of claim 10, wherein the deterministic errors include communication errors detected in a broadcast channel of the first device.

15. The one or more tangible computer-readable storage media of 14, wherein the secure signature is a group signature verifiable to confirm that the first device is a member of the group and the method further comprises:
- combining the output of the signing function computed on the first device with a signing function output from each other respective device in the group, the signing function output from each other respective device in the group being based on communication errors observed by the respective device in association with the select time interval.

16. The one or more tangible computer-readable storage media of claim 10, further comprising:
- receiving, at a second device, a message signed with the secure signature;
- computing, at the second device, an error matrix used to generate the secure signature; and
- verifying the error matrix is a Learning With Errors (LWE) matrix.

17. The one or more tangible computer-readable storage media of claim 10, wherein the signing function is a member of a key-homomorphic pseudorandom function (KH-PRF) family.

* * * * *